No. 608,073. Patented July 26, 1898.
H. N. PATTERSON.
SEED ATTACHMENT FOR GRAIN DRILLS.
(Application filed Oct. 22, 1897.)
(No Model.)
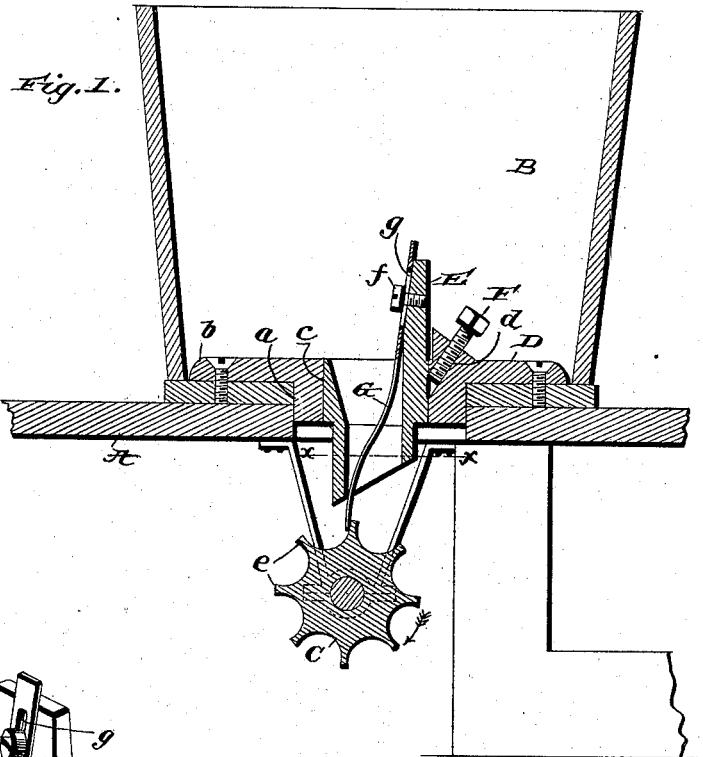
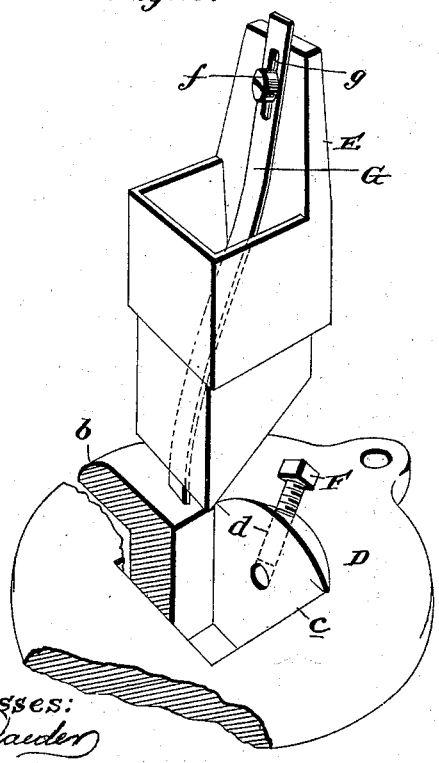
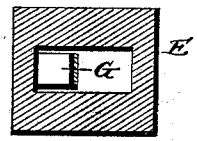
Witnesses:
Inventor
H. N. Patterson
By James Sheehy
Attorney

UNITED STATES PATENT OFFICE.

HENRY N. PATTERSON, OF HUMBOLDT, NEBRASKA.

SEED ATTACHMENT FOR GRAIN-DRILLS.

SPECIFICATION forming part of Letters Patent No. 608,073, dated July 26, 1898.

Application filed October 22, 1897. Serial No. 656,043. (No model.)

*To all whom it may concern:*

Be it known that I, HENRY N. PATTERSON, a citizen of the United States, residing at Humboldt, in the county of Richardson and State of Nebraska, have invented certain new and useful Improvements in Seed Attachments for Grain-Drills; and I do declare the following to be a full, clear, and exact description of the invention, such as will enable others skilled in the art to which it appertains to make and use the same.

My invention relates to grain-drills, and it contemplates the provision of an attachment for the seedboxes of grain-drills which will enable the same to properly sow small seeds.

The invention will be fully understood from the following description and claims when taken in conjunction with the annexed drawings, in which—

Figure 1 is a detail vertical section illustrating my improved attachment in conjunction with the seedbox and feed-wheel of a grain-drill. Fig. 2 comprises a perspective view of the seed-tube and a partially broken perspective view of the body-casting which receives and holds said tube, and Fig. 3 is an enlarged transverse section taken in the plane indicated by the line $x\ x$ of Fig. 1.

In the said drawings similar letters designate corresponding parts in all of the several views, referring to which—

A designates a portion of the frame of an ordinary grain-drill. B designates a seedbox which is supported by the frame and has an opening $a$ in its bottom for the passage of seed, and C designates a corrugated feed-wheel which is designed to be arranged within the ordinary hollow share or furrow-opener (not shown) and is also designed to be driven by suitable gearing (not shown) from one of the ground or traveling wheels. (Also not shown.) This construction may be used in the ordinary manner to sow large grain or seed; but when small seed is to be sown my improved attachment shown in Fig. 2 is employed. The said attachment in the preferred embodiment of my invention comprises an apertured body-casting D, which is designed to rest in the aperture $a$ of the seedbox and is provided with a flange $b$, resting on and designed to be connected by screws or other suitable means to the bottom of the seedbox, the tube E, which rests in the aperture $c$ of the body B, and the screw F, which takes through a threaded bore $d$ in the body D and impinges at its inner end against the tube E, so as to secure said tube in the body, as shown in Fig. 1.

G designates a strip of resilient metal or other suitable material which has for its purpose to control the passage of seed through the tube E. This strip G is connected to one wall of the tube E and normally impinges against the opposite wall, so as to close the tube and prevent the passage of seed through the same. It also depends below the lower end of the tube sufficiently far to permit it to be engaged by the peripheral projections $e$ of the wheel C, and consequently it will be observed that when said wheel is rotated in the direction indicated by arrow in Fig. 1 the free portion of the strip will be pressed away from the wall of the tube at frequent intervals, so as to permit one or more seeds to escape from the tube.

The manner described of connecting the tube E to the body-casting D is advantageous, because it permits of said tube being adjusted and adjustably fixed so as to insure the proper engagement of the strip G by the projections $e$ of feed-wheels located at various distances below the bottom of the feed-hopper. The attachment is thus adapted for use in drills of different makes having feed-wheels arranged at various distances below the bottom of the hoppers. When the attachment is designed for use in conjunction with a particular make of drill, the adjustable connection of the tube to the body-casting is unnecessary, and said body-casting and tube may, for the sake of cheapness, be formed in one piece, if desired.

To the end that a greater or less quantity of seed may be permitted to escape from the tube E as each projection $e$ of the feed-wheel engages the spring-strip G, I connect said strip to the wall of the tube by a screw $f$, which takes through a slot $g$ in the strip, or by any other suitable means which will permit of the strip being readily adjusted in the direction of its length. It will be readily appreciated that when the spring-strip G is moved downwardly the duration of the engagement between each projection $e$ and the strip G will be increased, and in consequence a considerable quantity of the seed will be permitted to escape from the tube at each movement of the strip away from the wall of the same, while when said strip is moved upwardly, the duration of such engagements will be lessened, as will also the quantity of seed permitted to escape from the tube at each movement of the spring-strip away from the wall of the same.

It will be appreciated from the foregoing that my improved attachment is very simple and practical, that it is adapted to be readily placed in and connected to the seedboxes of grain-drills, so as to enable the same to properly sow small seed, and that it is adapted to be readily removed when it is desired to use the drill for sowing large grain in the ordinary manner.

While it is advantageous for the reasons stated to embody my improvements in an attachment designed to be detachably connected to the seedbox of a grain-drill, yet when desired the improvements may be embodied in and form permanent parts of the seedbox and drill without departing from the scope of my invention, in which case the feed-wheel or any other suitable tappet may be employed.

Having thus described my invention, what I claim is—

1. The combination of a seedbox having a discharge-tube for seed, a resilient strip arranged in and suitably connected with one side of the tube and having a free portion impinging against the opposite side of the tube and also having such free portion depending below the tube, and a suitable tappet for engaging and moving the depending free portion of the strip away from the wall of the tube at intervals, substantially as specified.

2. The combination of a seedbox having a discharge-tube for seed, a resilient strip arranged in and adjustably connected with one side of the tube so as to permit of it being adjusted in the direction of its length and having a free portion impinging against the opposite side of the tube and also having such free portion depending below the tube, and a suitable tappet for engaging and moving the free portion of the strip away from the wall of the tube at intervals, substantially as specified.

3. The combination with a seedbox having an opening in its bottom, and a wheel disposed below said box and having peripheral projections; of the attachment connected to the bottom of the seedbox and having the depending tube extending through the opening in said bottom, and a resilient strip arranged in and suitably connected with one side of the tube and having a free portion impinging against the opposite side of the tube and also having such free portion depending below the tube and arranged so as to be engaged by the peripheral projections of the wheel, substantially as specified.

4. The combination with a seedbox having an opening in its bottom, and a wheel disposed below said box and having peripheral projections; of the attachment connected to the bottom of the seedbox and comprising the apertured body-casting having a threaded bore communicating with its aperture, the tube arranged in the aperture of the body-casting, the screw extending through the bore of the casting and impinging against the tube, and a resilient strip arranged in and suitably connected with one side of the tube and having a free portion impinging against the opposite side of the tube and also having such free portion depending below the tube and arranged so as to be engaged by the peripheral projections of the wheel, substantially as specified.

In testimony whereof I affix my signature in presence of two witnesses.

HENRY N. PATTERSON.

Witnesses:
E. W. ELWELL,
J. M. REVELLE.